United States Patent
Hurtta et al.

(10) Patent No.: US 7,623,529 B2
(45) Date of Patent: Nov. 24, 2009

(54) ADDRESS DE-REGISTRATION FROM IP MULTIMEDIA NETWORKS

(75) Inventors: Tuija Hurtta, Espoo (FI); Tony Hulkkonen, Helsinki (FI); Jaakko Rajaniemi, Helsinki (FI); Mohan Sivanandan, Roswell, GA (US); Markku Tuohino, Espoo (FI)

(73) Assignee: Nokia Corporation, Espoo (FI)

( * ) Notice: Subject to any disclaimer, the term of this patent is extended or adjusted under 35 U.S.C. 154(b) by 873 days.

(21) Appl. No.: 10/398,575

(22) PCT Filed: Oct. 9, 2001

(86) PCT No.: PCT/EP01/11656

§ 371 (c)(1),
(2), (4) Date: Aug. 26, 2003

(87) PCT Pub. No.: WO02/32084

PCT Pub. Date: Apr. 18, 2002

(65) Prior Publication Data

US 2005/0117591 A1 Jun. 2, 2005

(30) Foreign Application Priority Data

Oct. 9, 2000 (WO) ...................... PCT/EP00/09886

(51) Int. Cl.
*H04L 12/28* (2006.01)
(52) U.S. Cl. ...................................... 370/401; 370/475
(58) Field of Classification Search ............. 370/395.4, 370/412, 401, 475, 496, 351, 331
See application file for complete search history.

(56) References Cited

U.S. PATENT DOCUMENTS

| | | | | |
|---|---|---|---|---|
| 6,088,728 A * | 7/2000 | Bellemore et al. | .......... | 709/227 |
| 6,469,998 B1 * | 10/2002 | Burgaleta Salinas et al. | .......... | 370/338 |
| 6,473,411 B1 * | 10/2002 | Kumaki et al. | .......... | 370/331 |
| 6,546,425 B1 * | 4/2003 | Hanson et al. | .......... | 709/227 |
| 6,725,036 B1 * | 4/2004 | Faccin et al. | .......... | 455/433 |

(Continued)

FOREIGN PATENT DOCUMENTS

WO 96/38010 * 11/1996

(Continued)

OTHER PUBLICATIONS

Postel J. Internet Control Message Protocol RFC-792 Sep. 1981 p. 1.*

(Continued)

*Primary Examiner*—Ricky Ngo
*Assistant Examiner*—Gary Mui
(74) *Attorney, Agent, or Firm*—Harrington & Smith, PC

(57) ABSTRACT

According to one aspect, a communication network system comprising at least one first network and at least one second network providing application services over the first network is described. The system comprises first network means (GGSN) for receiving a message associated with an IP address allocated by the first network from the second network, for detecting that there is no active communication channel for this IP address which is allocated to a user equipment, and for sending an indication that the user equipment is not reachable through this IP address to the second network. The system further comprises second network means (P-CSCF/PCF) for receiving this indication.

67 Claims, 7 Drawing Sheets

U.S. PATENT DOCUMENTS

2001/0043577 A1* 11/2001 Barany et al. ............... 370/328
2002/0036983 A1* 3/2002 Widegren et al. ........ 370/230.1

FOREIGN PATENT DOCUMENTS

WO      99/61966      12/1999
WO      00/24209 A      4/2000

OTHER PUBLICATIONS

"Call control scenarios in the "all-IP" UMTS core network" Proceedings 11$^{th}$ IEEE International Symposium on Personal Indoor and Mobile Radio Communications. PIMRC 2000, vol. 1, Sep. 18-21, 2000 pp. 322-326.

"UMTS all-IP Mobility Management, Call and session control Procedure" Internet Draft, Mar. 24, 2000.

* cited by examiner

ADDRESS DE-REGISTRATION FROM IP MULTIMEDIA NETWORKS

FIELD OF THE INVENTION

The present invention relates to the de-registration of IP addresses assigned to users in an access network like GPRS (General Packet Radio Service) and IP (Internet Protocol) Multimedia networks.

BACKGROUND OF THE INVENTION

The future VoIP (Voice over IP) networks are being designed using the layered approach, consisting of IM (IP Multimedia) networks providing the Application Level services over some Transport Level access network with maximum possible independence between the two layers. The 3GPP standardization efforts for R00 were focused on GPRS as the Transport Level access network.

In order to access the IP Multimedia services via the GPRS access network, the UE (UE refers to User Equipment or Application; whenever UE or User Equipment is referred to later in this document, it may also refer to possible User Agent or Application) must perform GPRS attach and activate the necessary PDP (Packet Data Protocol) context first, before registering with the IM network. During the PDP context activation, the GPRS network (GGSN (Gateway GPRS Support Node), more specifically) allocates to the UE an IP address, which is used by the GPRS network to address the UE. This IP address is conveyed to the IM network during the application level registration and is used also by the IM network to address the UE.

In most of the cases, the IP addresses are allocated to the user dynamically by the GPRS network during the PDP context activation. This can be arranged by two ways: either a GGSN has a pool of IP addresses or the DHCP (Dynamic Host Configuration Protocol) server allocates the address. An IP address thus allocated is freed when the PDP context is deactivated explicitly by the UE performing PDP context deactivation or implicitly, for example, after the UE becomes unreachable or fails to perform a periodic routing area update (RAU). The same IP address could be re-allocated to a different user by the GPRS network.

It may be possible that the UE explicitly performs PDP context deactivation with the GPRS network but does not perform any specific de-registration with the IM network. It is also possible that a PDP context associated with the UE is implicitly deactivated by the GPRS network for some reason as mentioned above. In all these situations, the IM network is not aware that the IP address of the UE has become invalid, or even worse, the IP address has been allocated to another user. In the later case, messages coming from the IM network (e.g., in call setup) might be delivered to a different UE which happens to use that IP address at present.

SUMMARY OF THE INVENTION

It is an object of the present invention to provide consistency of IP addresses assigned to users in an access network and networks providing application services through the access network.

According to one aspect of the present invention, this object is achieved by a communication network system comprising at least one first network (GPRS) and at least one second network providing application services over the first network, the first network allocating an IP address used by the second network, said system comprising:

means for detecting that the IP address allocated to a user equipment is de-allocated by the first network; and
means for initiating a de-registration of the de-allocated IP address in the second network.

The system may further comprise a control entity (PCF) being arranged to communicate with a gating network element (GGSN) in the first network and a dedicated call serving network element (CSCF) in the second network, the dedicated call serving network element serving the requested application, wherein the gating network element detects a communication channel deactivation, and informs the control entity thereof, wherein the control entity detects that the deactivated communication channel represents a signaling PDP context and initiates the de-registration in the dedicated call serving network element.

The gating network element may supply an indication of the signaling PDP context to the control entity.

The control entity may detect that the deactivated communication channel represents a signaling PDP context by checking request state information in the control entity.

The gating network element may be informed by a serving network element in the first network about a communication channel deactivation and forwards this information to the control entity.

Moreover, a network element in the first network may detect the de-allocation of the IP address and informs a server about the de-allocation, and the server initiates de-registration in call serving network elements in the second network, to which said IP-address is associated with.

The server may be a home subscriber server (HSS).

A network element (SGSN) in the first network may inform a database (HLR) about the de-allocation, the home database informs a mobility serving entity (UMS) about the de-allocation, and the mobility serving entity initiates the de-registration in a dedicated call serving network element (CSCF) in the second network, the dedicated call serving network element serving the requested application.

Furthermore, the network element in the first network may detect a detach of the user equipment causing the de-allocation for all IP addresses of the user equipment and inform the server about the de-allocation, and the server initiates de-registration in all call serving network elements of the user equipment.

A gating network element (GGSN) in the first network stores addresses of call serving network elements proposed to the user equipment against the allocated IP address and a user identification, the gating network element allocating the IP address and being involved in the discovery procedure of a call serving network element (CSCF) in the second network, the call serving network elements being able to serve the requested application, and, when the gating network element detects the de-allocation of the IP address, it initiates de-registration in all stored call serving network elements associated with the IP addresses in the second network.

The user equipment may inform a gating network element (GGSN) in the first network whenever it registers with a call serving network element (CSCF) in the second network, the gating network element allocating the IP address and being involved in the discovery procedure of a call serving network element (CSCF) in the second network, the call serving network elements being able to serve the requested application, wherein the gating network element stores addresses of the registered call serving network elements against the allocated IP addresses and a user identification, and, when the gating network element detects the de-allocation of the IP addresses, it initiates the de-registration in all stored call serving network nodes associated with the IP addresses.

The de-allocation of the IP address caused by a communication channel deactivation may be detected by a gating network element in the first network, and the server is informed by the gating network element about the de-allocation.

Moreover, a de-allocation of the IP address caused by a detach of the user equipment is detected by a serving network element (SGSN) in the first network, and the home server is informed by the serving network element about the de-allocation.

The server may be informed by the user equipment about all call serving network elements the user equipment is registered with.

The IP address may be de-registered in the second network by deleting a record in a home server (HSS) in the first network by a call serving network element in the second network.

An IP address may be allocated for each communication channel request performed by the user equipment.

The initiation of the de-registration may comprise the supply of a de-register message.

The first network may be a wireless access network and the second network may be an IP multimedia network.

In addition, the communication channel by be a PDP context.

Furthermore, the above-mentioned object is achieved by a control entity which is arranged to communicate with a gating network element (GGSN) in a first network and a dedicated call serving network element (CSCF) in a second network providing application services over the first network, the first network allocating an IP address used by the second network, the dedicated call serving network element serving the requested application, wherein the control entity receives information from the gating network element about a communication channel deactivation wherein the control entity detects that the deactivated communication channel represents a signaling PDP context and initiates the de-registration in the dedicated call serving network element.

Moreover, the above-mentioned object is achieved by a method of providing communication between at least one first network (GPRS) and at least one second network providing application services over the first network, the first network allocating an IP address used by the second network, said method comprising:

detecting that the IP address allocated to a user equipment is de-allocated by the first network; and initiating a de-registration of the de-allocated IP address in the second network.

The invention applies to cases when the UE explicitly or implicitly de-registers with the access network and its IP address is freed. Of course, after this has happened, the UE is not capable of communicating with the CSCF. For example, an explicit de-allocation comprises a PDP context deactivation or an explicit detach procedure when the UE is switched off. An implicit de-allocation occurs, for example, when the UE fails to perform a periodic routing area update.

Users may be registered with multiple CSCFs of different IM networks, and the same user may have more than one IP addresses assigned.

The PCF functionality can be provided in a separate network element or may be contained in another network element like CSCF.

Further features of the present invention are defined in the dependent claims.

The invention applies to cases when the UE explicitly or implicitly de-registers with the access network and its IP address is freed. Of course, after this has happened, the UE is not capable of communicating with the CSCF. For example, an explicit de-allocation comprises a PDP context deactivation or an explicit detach procedure when the UE is switched off. An implicit de-allocation occurs, for example, when the UE fails to perform a periodic routing area update.

In the following the present invention will be described by way of embodiments thereof with reference to the accompanying drawings.

DESCRIPTION OF THE PRESENT INVENTION

Figure 1:
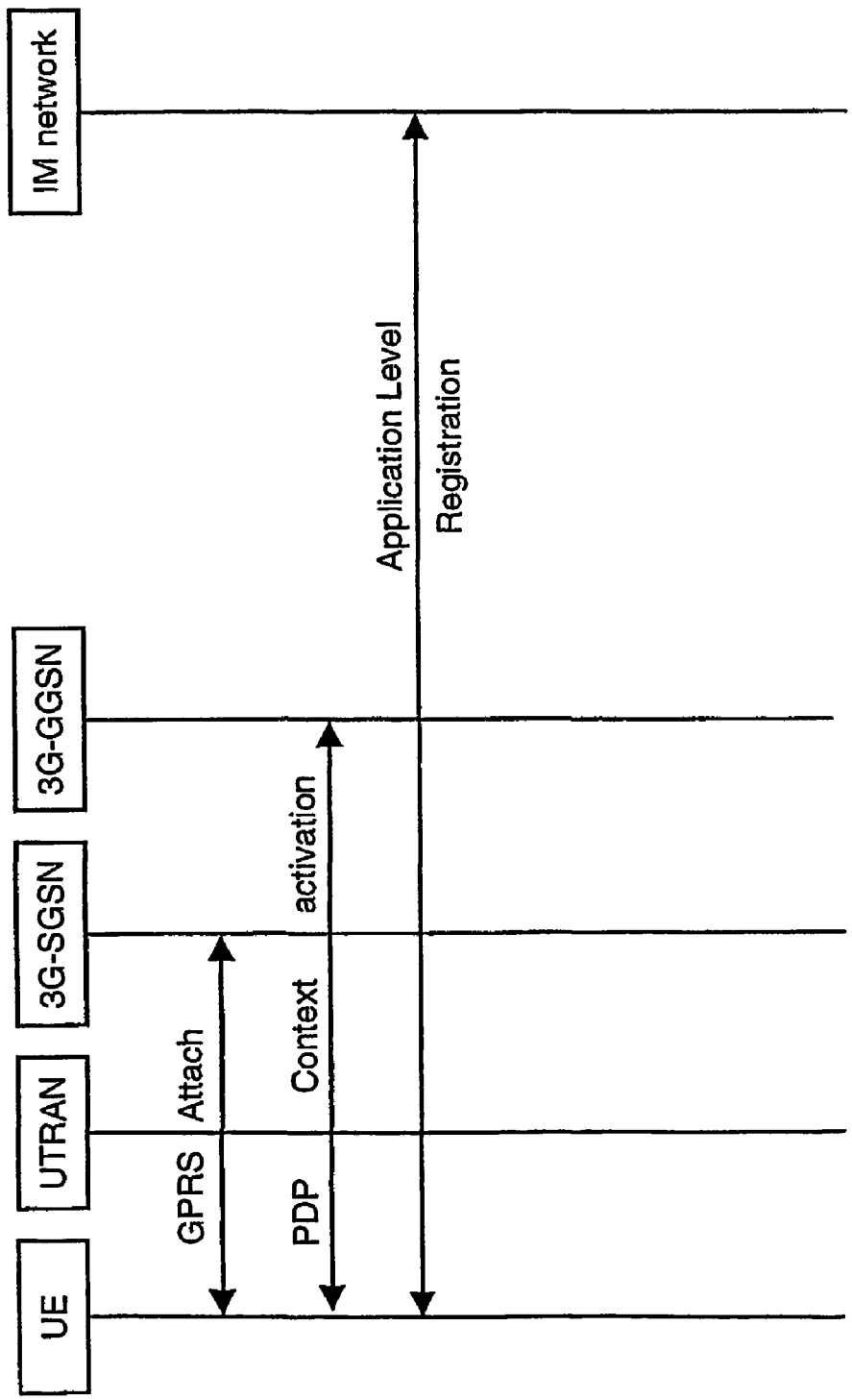
FIG. 1 shows a signaling diagram of an IP multimedia service access via GPRS access network.

FIG. 1 shows a signaling diagram, schematically illustrating a GPRS attach performed by a UE (User Equipment) towards a GPRS (General Packet Radio Service) network via a UTRAN (Universal Terrestrial Radio Access Network). Before registering with an IM (IP Multimedia) network via a CSCF (Call Server Control Function), the UE has also to activate a PDP context towards a 3G-GGSN (Third Generation Gateway GPRS Support Node) via a 3G-SGSN (Third Generation Serving GPRS Support Node). The GGSN allocates to the UE an IP address which is used by the GPRS network to address the UE. This IP address is conveyed to the IM network during the application level registration by the UE or the User Application.

The UE may have multiple PDP Contexts activated with GPRS and have multiple IP addresses in use. Moreover, the UE may be registered with multiple CSCFs, where each CSCF may have multiple IP addresses for the same user, depending on the application or service.

In order to solve the above-described problem of inconsistent IP addresses used by the GPRS and the IM networks to address the users, arising due to the situation when an IP address assigned to a UE is de-allocated by the GPRS network for explicit or implicit reasons without the IM network knowing it, the IM network should be somehow informed about the de-allocation of the IP address assigned to a UE. As a minimal solution, the GPRS network must at least detect messages and data intended for the UE which had been assigned the now de-allocated IP address and discard them.

In situations where IM network cannot be informed about the release or reallocation of a UE IP address and the SGSN/

GGSN does not "sniff" the mobile terminated call/session setups, the IM network must authenticate the user in every mobile terminated transaction to make sure that it is still the same user reached at the IP address which the CSCF has registered for a particular user. This, however, does not solve the problem of signaling messages being sent to a wrong target, but reduces the seriousness of the problem, as this would make sure that the mobile terminated setup fails due to authentication failure, though some signaling takes place.

Moreover, the UEs may be required to perform periodic registration updates at certain time intervals as agreed by the UE and the IM network during the first registration. A registration performed with a CSCF in an IM network would terminate if the UE does not perform a periodic registration update. This, however does not completely solve the above-described problem since the UE may have a longer duration for periodic registration updates than the one at the GPRS level for periodic routing area update and the two procedures may not be synchronized. Further, the possibility of explicit GPRS level deactivation while there is a valid IM level registration would still cause the above-mentioned problem.

These approaches merely reduce the chances or seriousness of the above-described problem. In the following, embodiments of the present invention are described, which provide complete solutions of the problem.

Figure 2:
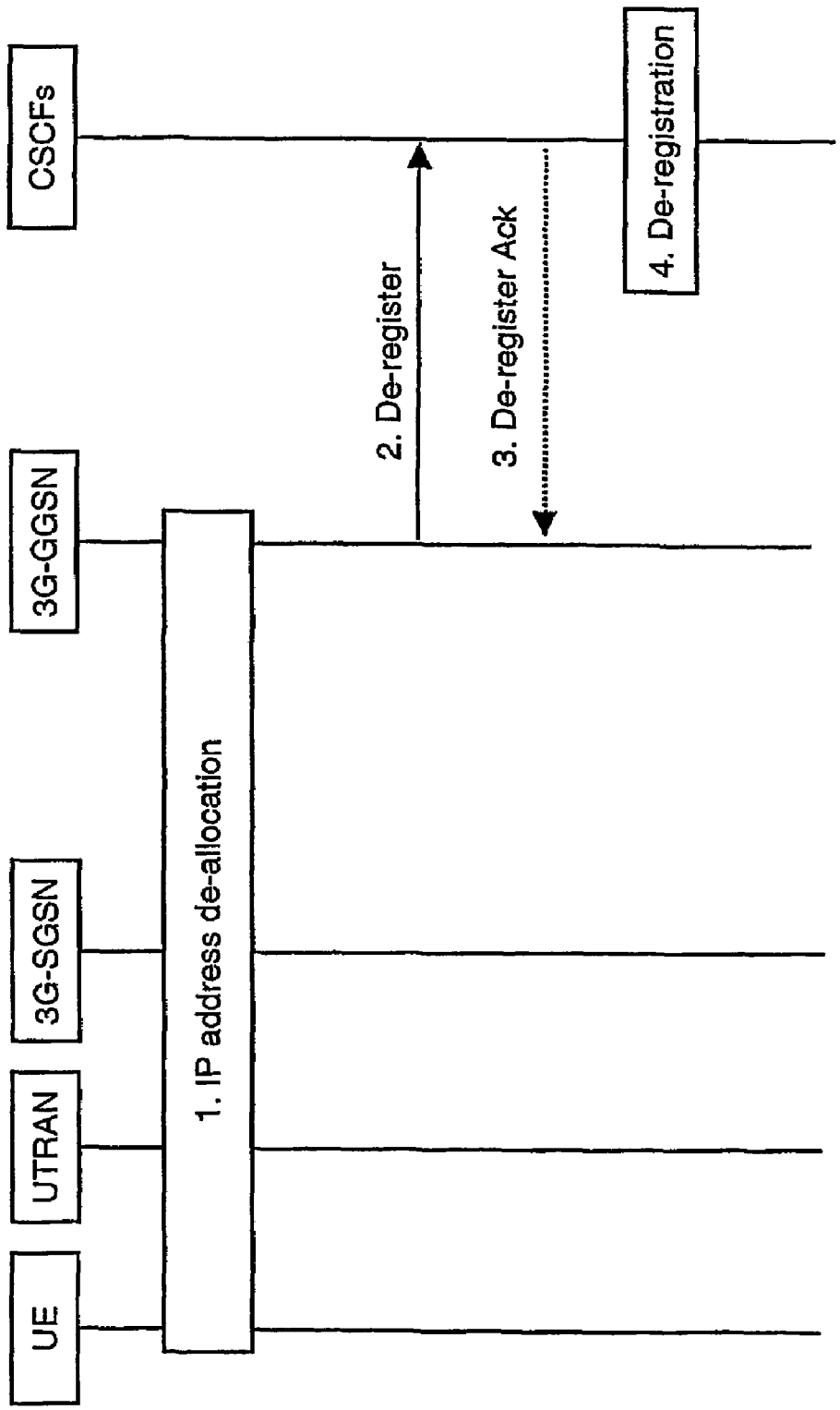
FIG. 2 shows a signaling diagram of a de-register procedure caused by an IP address de-allocation according to an embodiment of the present invention.

FIG. 2 shows a signaling diagram illustrating an IP address de-registration according to an embodiment of the present invention.

In order to register for IM network services, the UE is required to select a CSCF in the IM network with the assistance of the GPRS network, i.e. the GGSN, known as CSCF discovery procedure. Hence, the GGSN is aware of the CSCFs proposed to the UE. The GGSN also stores the addresses of the proposed CSCFs against the allocated IP address of the user and the IMSI (International Mobile Subscriber Identity), which identifies the user in the GPRS network. When the IP address of the user is de-allocated (FIG. 2: 1. IP address de-allocation) due to explicit reasons, i.e. when the UE performs a PDP context deactivation, or due to implicit reasons, i.e. after the UE becomes unreachable or fails to perform a periodic routing area update, the GGSN informs about this to all the proposed CSCFs (communication 2 in FIG. 2: the 3G-GGSN transmits a de-register message to the CSCFS), which were stored in the table. Thereupon, the CSCFs may acknowledge by sending a de-register Ack message (communication 3 in FIG. 2) to the GGSN. The CSCFs initiate the de-registration upon receiving the de-register message from the GGSN (FIG. 2: 4. De-registration).

In particular, in case of an explicit PDP context de-activation, the UE may choose to deactivate just one or two PDP contexts while it continues to have the rest of PDP contexts active. In this case, only the IP addresses allocated by the deactivated PDP contexts will be de-allocated while the UE continues to use other existing IP addresses. These de-allocated IP addresses may be used to address the UE by one or more CSCFs. Hence, in this case, the GGSN notifies only the one or more CSCFs using the de-allocated IP addresses to address the particular UE.

In the case of an implicit PDP context activation, the GPRS may de-activate all the active PDP contexts and IP addresses for that particular UE. Hence, in this case, the GGSN notifies all CSCFs of the particular UE for all IP addresses.

The GGSN must have up-to-date knowledge of the IP addresses used by a UE and the CSCFs the UE is registered to. Therefore, ever time the UE performs a new registration or de-registration, the GGSN must be aware of it.

The disadvantage of this solution is that the CSCFs which were not selected by the UE will also be notified. This can be avoided by informing the GGSN providing the addresses of the CSCFs (or logical names that can be used to get the actual address), whenever the UE registers with one or more CSCFs for service. The GGSN stores the addresses of the CSCFs against the allocated IP address of the user and the IMSI. When the IP address of the user is de-allocated, the GGSN informs about this to all those CSCFs, which were stored. When the UE de-registers with a CSCF too, it notifies the GGSN, so that the GGSN can remove this CSCF from the stored list. This way, only the CSCFs the UE has actually been registered to are notified by the GGSN.

Moreover, the mobile-terminated call/session setup message from the CSCF can be defined to contain also a user identifier like IMSI, which is the subscriber identity at GPRS level. The GGSN checks all the mobile-terminated call setup messages and compares them against its list of active IMSIs and the corresponding IP addresses. If the received IMSI and IP address pair is not found, the GGSN discards the data. Optionally the GGSN could also notify the CSCF about the situation if the CSCF address is known.

Figure 3:
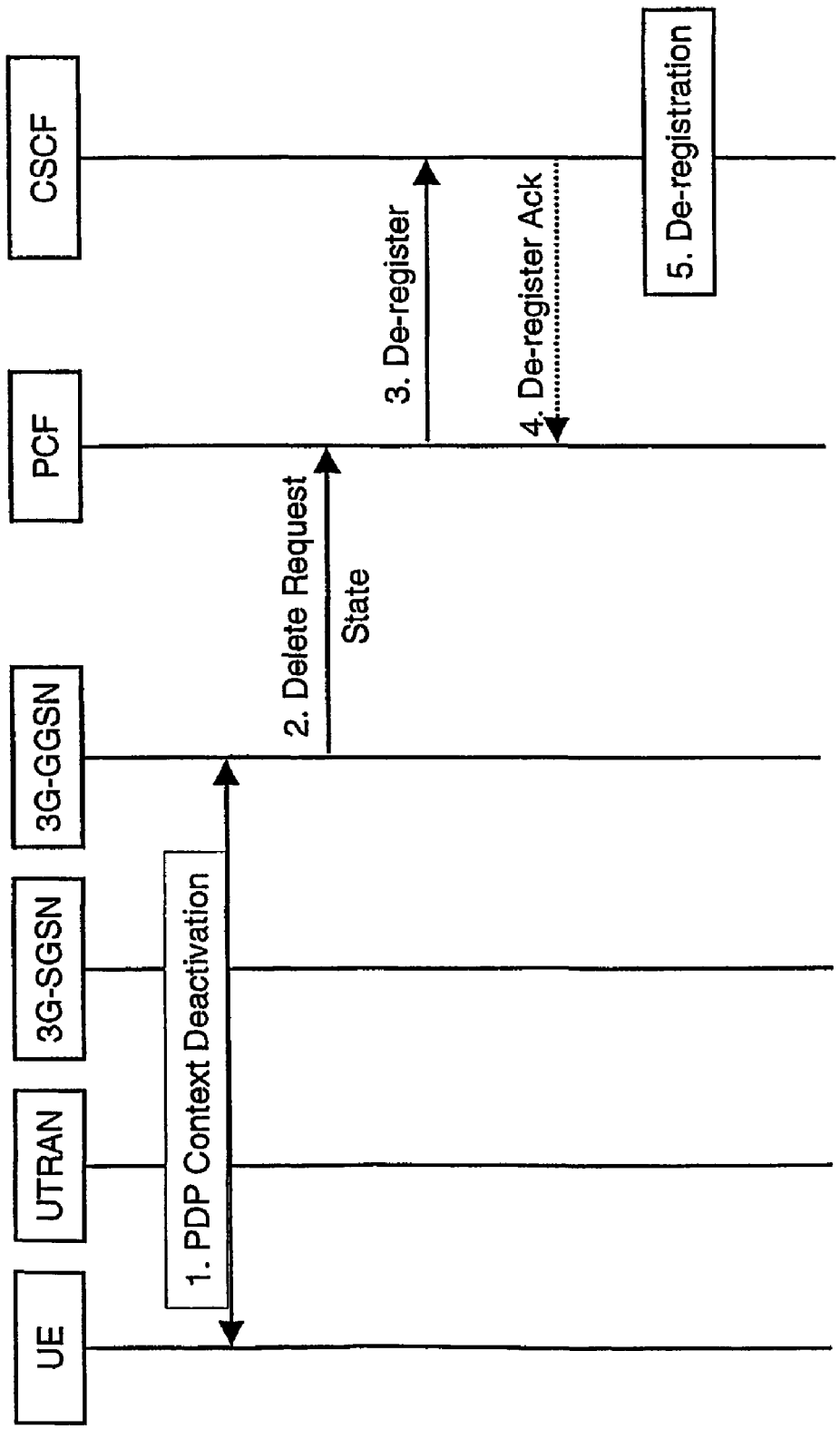
FIG. 3 shows a signaling diagram of a de-register procedure caused by a PDP context deactivation according to an embodiment of the present invention.

FIG. 3 shows a signaling diagram illustrating a de-registration procedure due to a PDP context deactivation according to an embodiment of the present invention.

This embodiment utilizes a PCF (Policy Control Function) to relay the indication on IP address de-allocation from the access network to the IM network. In general, the task of Policy Control is to divide the available network resource in a defined manner over the set of network users competing for that resource. Policy Control enforces a connection admission policy. A connection admission policy is a set of rules defining under what circumstances (other than the mere availability of the requested resource) the request for a logical connection is to be accepted.

The PCF is able to communicate with the GGSN and the CSCF. (It may also be possible for the PCF functionality to be incorporated into the CSCF or GGSN.) The UE needs a PDP context in order to communicate with the proxy CSCF. The PCF is informed about deactivating the signaling PDP context. As it is shown in communication 1 in FIG. 3, the signaling PDP context is deactivated in the GPRS network. Thereupon, the GGSN sends a Delete Request State (Request Id) message to the PCF (communication 2 in FIG. 3). The PCF notices that the deactivated PDP context is a signaling PDP context. This may happen either by receiving an indication of the signaling PDP context from the GGSN or by checking the request state information in the PCF. In communication 3 in FIG. 3, the PCF sends a De-register (Subscriber Id) message to the proxy CSCF. The PCF may also send the de-register message to a serving CSCF serving the IM network application requested by the UE.

The proxy CSCF may acknowledge by sending a De-register Ack (Subscriber Id) message to the PCF (communication 4 in FIG. 3). Then, the proxy CSCF initiates de-registration (FIG. 3: 5. De-registration) by informing the HSS about the de-registration.

When the UE deactivates its PDP contexts, the SGSN knows about it and forwards information (about the latest deactivated PDP context) to the GGSN. The GGSN forwards the information to the PCF, and the PCF forwards it to the CSCF.

Figure 4:
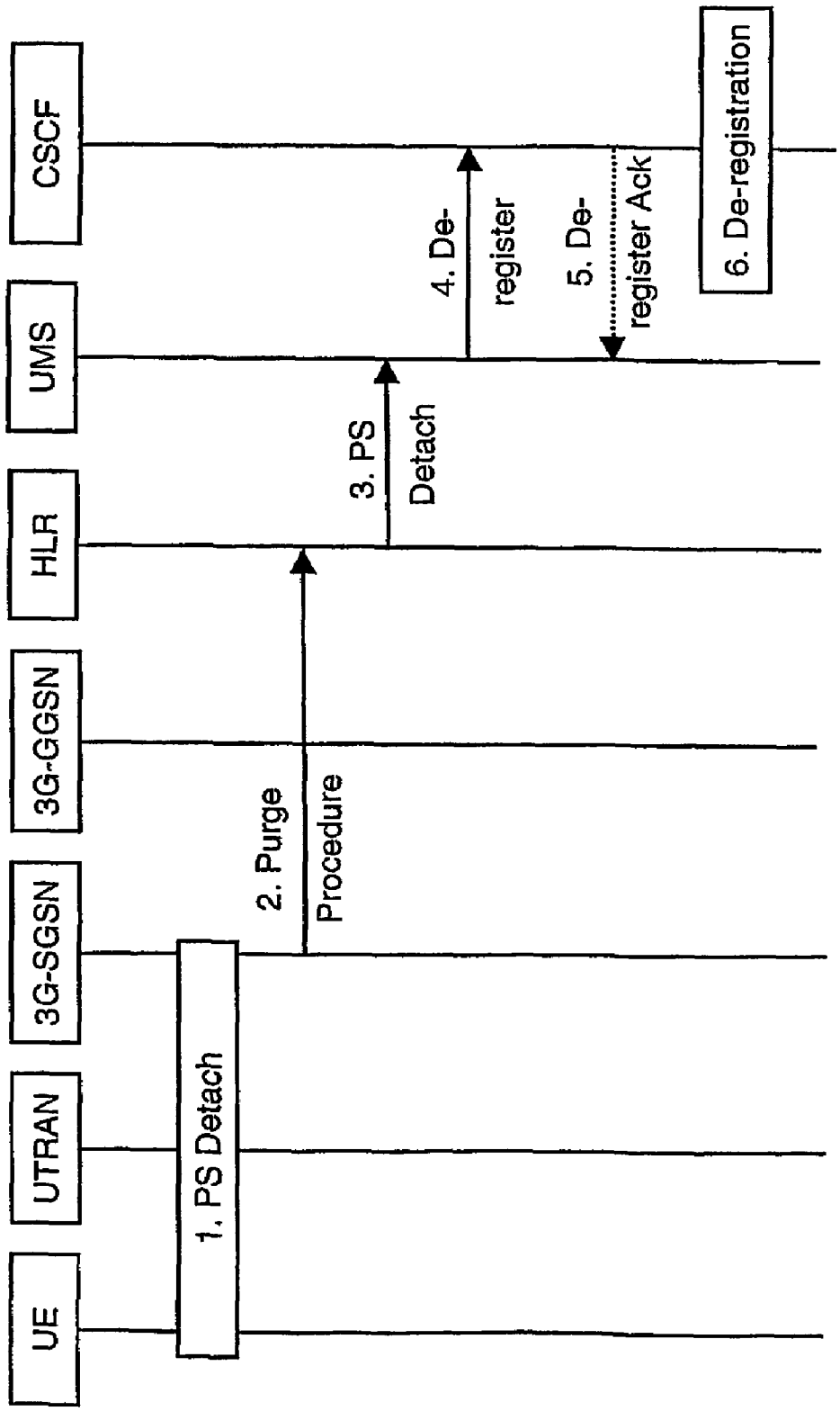
FIG. 4 shows a signaling diagram of a de-register procedure caused by a PS detach according to an embodiment of the present invention.

The access network can also trigger de-registration from the IP multimedia services when the UE performs a PS detach, i.e. when the IP address assigned to the UE is de-allocated implicitly as mentioned above. This case is shown in FIG. 4, illustrating a de-registration due to PS detach according to an embodiment of the present invention. In case of a PS detach (FIG. 4: 1. PS detach), the SGSN informs an HLR (Home Location Register) by performing the Purge procedure (communication 2 in FIG. 4). The HLR in turn informs a UMS (User Mobility Server) about the PS detach (communication 3 in FIG. 4), which then informs the CSCF (communication 4 in FIG. 4). When receiving the information, the CSCF initiates de-registration (communication 4 in FIG. 4). The CSCF may send a De-register Ack message (communication 5 in FIG. 4) to the UMS.

Figure 5:
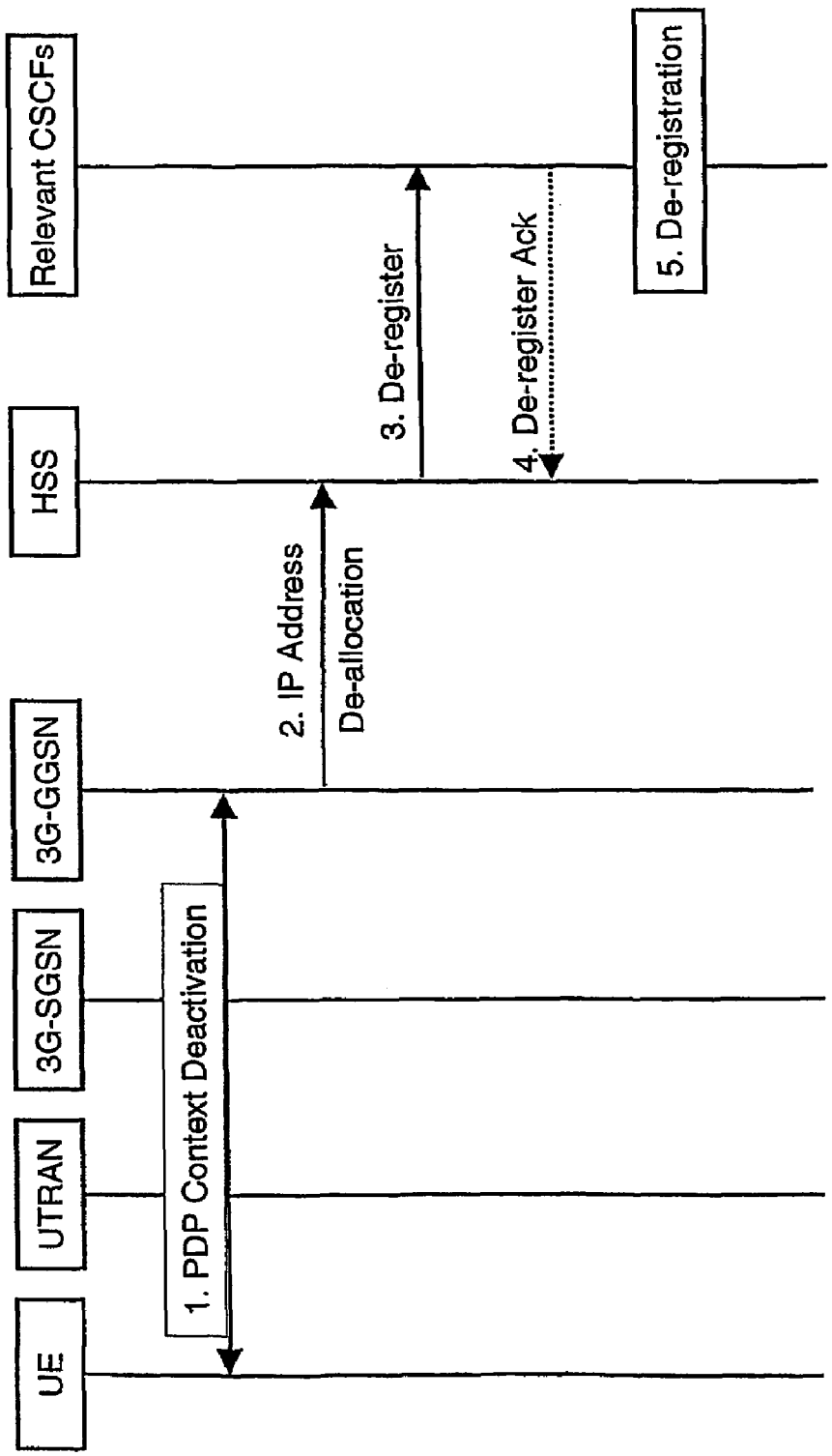
FIG. 5 shows a signaling diagram of a de-register procedure caused by a PDP context deactivation according to an embodiment of the present invention.

FIG. 5 shows a signaling diagram illustrating a de-registration due to a PDP context deactivation according to an embodiment of the present invention. When the PDP context is deactivated in the GPRS network, the GGSN indicates to an HSS (Home Subscriber Server) about it (FIG. 5: 2. IP address de-allocation). The HSS knows all possible CSCFs the UE has been registered with, and therefore, it informs the relevant CSCFs in sending de-register messages (communication 3 in FIG. 5). The relevant CSCFs may send de-register Ack messages to the HSS and initiate de-registration.

In the case of an explicit PDP context deactivation, the GGSN notifies the HSS about the particular UE and only the de-allocated IP addresses and then the HSS updates its own record and notifies only the one or more CSCFs using the deallocated IP addresses to address the particular UE.

Figure 6:
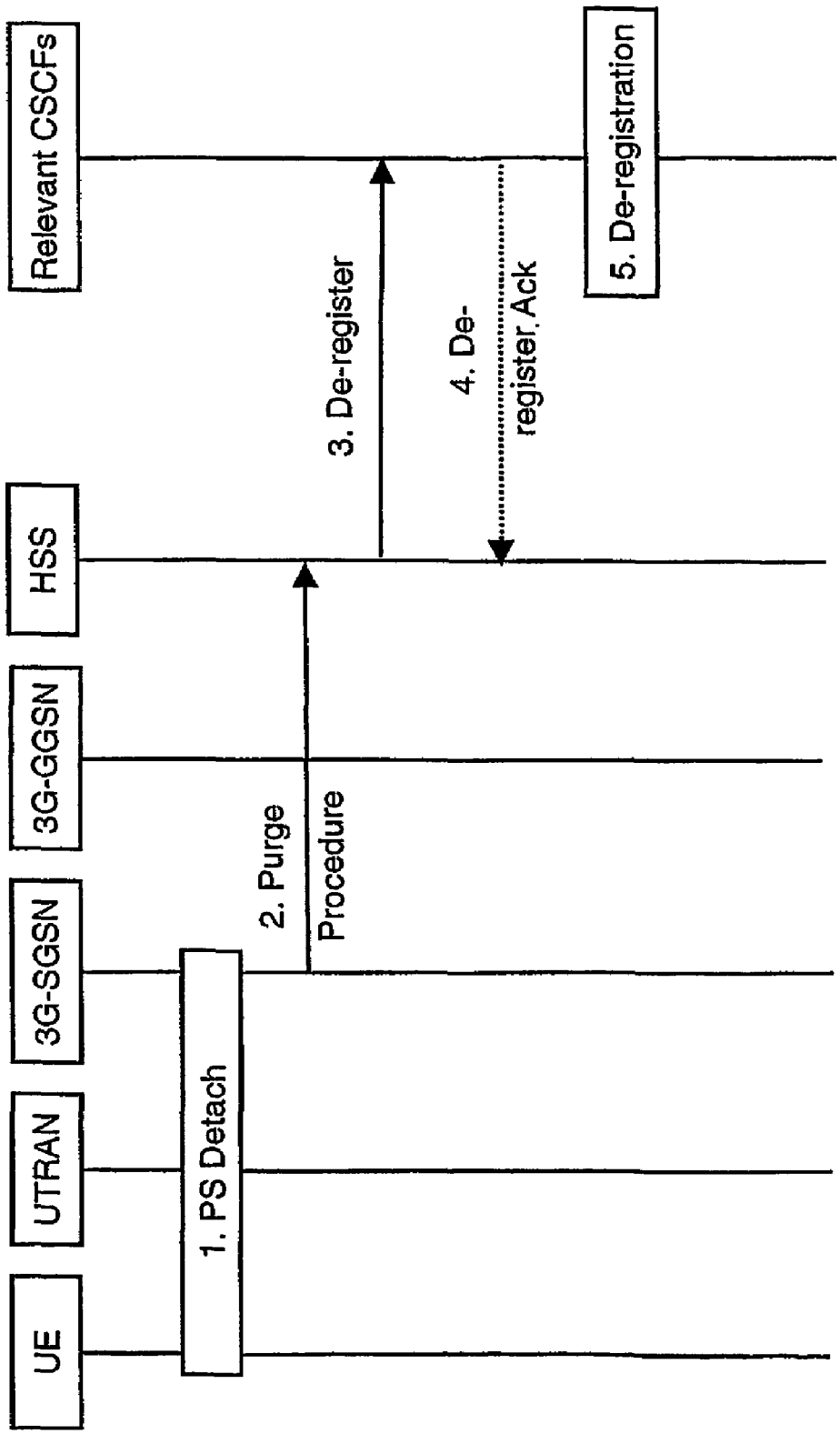
FIG. 6 shows a signaling diagram of a de-register procedure caused by PS detach according to an embodiment of the present invention.

FIG. 6 shows the case of a de-registration due to a PS detach according to this embodiment. For example, if the UE fails to perform the periodic routing area update, the SGSN informs the HSS about it by performing the Purge procedure (communication 2 in FIG. 6), and the HSS in turn notifies the CSCFs serving the UE by sending the de-register message (communication 3 in FIG. 6). The relevant CSCFs may send the de-register Ack message and initiate the de-registration.

In the case of an implicit PDP context deactivation, the GPRS network de-activates all the active PDP contexts and IP addresses for that particular UE. Hence, the de-registration performed by the HSS is done for all IP addresses and all CSCFs of the particular UE.

The HSS must have up-to-date knowledge of the IP addresses used by a UE and the CSCFs the UE is registered to. Therefore, ever time the UE performs a new registration or de-registration, the HSS must be aware of it.

Figure 7:
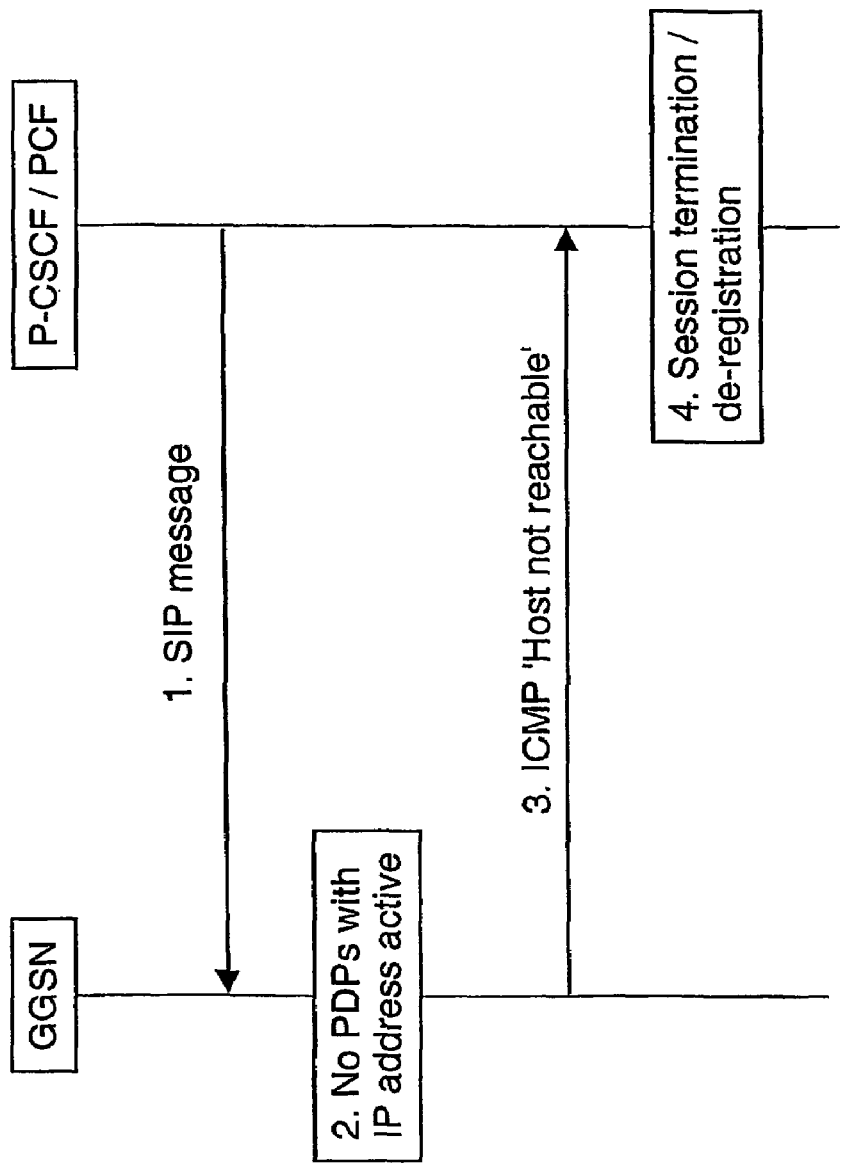
FIG. 7 shows a signaling diagram of a de-register or session termination procedure caused by an ICMP message according to a preferred embodiment of the present invention.

FIG. 7 shows a signaling diagram according to the preferred embodiment of the present invention.

As described above, in certain cases, e.g. in error cases, it is possible that all the PDP contexts of a UE are deactivated but the UE still remains registered to the IM network. In this case, it is not possible to carry a MT (Mobile Terminated) SIP (Session Initiation Protocol) message to the UE even if the IM network thinks that the UE is registered.

As shown in FIG. 7, if the GGSN receives a SIP message (communication 1 in FIG. 7) and does not have an active PDP context with the IP address indicated in the SIP message (block 2 in FIG. 7), then the GGSN sends an ICMP (Internet Control Message Protocol) message 'Host not reachable' to the node which initiated the SIP message, i.e. to the P-CSCF (communication 3 in FIG. 7).

In block 2 in FIG. 7, the GGSN determines whether or not the IP address indicated in the received SIP message belongs to an active PDP context. If there is no active PDP context with this IP address, the GGSN issues the ICMP message to the P-CSCF.

It is to be noted that a PCF can be connected between the GGSN which may be a 3G-GGSN and the P-CSCF in a manner similar as shown in FIG. 3.

The P-CSCF can then either terminate the session which is under the setup phase or terminate all active sessions or initiate de-registration of the UE (block 4 in FIG. 7).

Session termination requires sending a reject message or a BYE message from the P-CSCF towards the peer. If session termination is performed, a flag may be set in the IM network, e.g. in the P-CSCF or S-CSCF, to indicate that the UE is not anymore available for MT SIP messages. The UE is thus kept registered, but no MT SIP messages are sent to the UE before the UE becomes available again. The IM network knows that the UE is available again e.g. when the UE performs re-registration. If the UE is able to perform re-registration, it has an active PDP context to carry SIP messages. Thus, e.g. at re-registration, the flag in the IM network can be removed. This also indicates that if the UE has lost all its PDP contexts, it should perform re-registration immediately when getting an active PDP context.

It is to be noted that a flag indicating that the user equipment is not available for user equipment terminated messages may be set not only when session termination is performed. For example, such flag may be set when a message is received which indicates that there is no active PDP context with the specific IP address.

De-registration may require sending a SIP message from the P-CSCF to the S-CSCF, e.g. a 480 Temporarily Unavailable message with an indication to perform de-registration, and initiate de-registration from the S-CSCF. As an alternative, the P-CSCF may initiate de-registration immediately. The latter is not the preferred solution, because currently the P-CSCF is not allowed to perform de-registration.

It would be good to know in the IM network if the UE has become unavailable. This way, SIP messages would not be sent to such a UE, because the UE is not able to receive them.

Though the invention is described referring to GPRS as the wireless access network, the principles of the invention can be applied also to other wireless networks.

According to one aspect, a communication network system comprising at least one first network (GPRS) and at least one second network providing application services over the first network is described. The first network allocates an IP address used by the second network. The system comprises means for detecting that the IP address allocated to a user equipment is de-allocated by the first network and means for initiating a de-registration of the de-allocated IP address in the second network.

While the invention has been described with reference to a preferred embodiment, the description is illustrative of the invention and is not to be construed as limiting the invention. Various modifications and applications may occur to those skilled in the art without departing from the true spirit and scope of the invention as defined by the appended claims.

The invention claimed is:

1. A system, comprising:
at least one first network and at least one second network providing application services over the first network, the first network allocating an IP address of a user equipment based on a communication channel activated by the user equipment in the first network, the IP address being conveyed to the second network during an application level registration at the second network by the user equipment;
a first network unit configured to receive a message associated with said IP address from the second network, configured to detect that there is no active communication channel for said IP address, and configured to send an indication that the user equipment is not reachable through said IP address to the second network; and a second network unit configured to receive said indication, wherein the second network unit, upon receiving the user equipment not reachable indication, is configured to initiate a de-registration of the user equipment in the second network, and wherein the second network unit, for initiating the de-registration, is configured to send a message with an indication to perform de-registration to a serving network node in the second network, said message being sent to inform at least one other network element that said IP address can no longer be used to reach said user equipment.

2. The system according to claim 1, wherein said message comprises the IP address.

3. The system according to claim 1, wherein the second network comprises an inhibiting unit configured to inhibit sending further messages to the unreachable user equipment upon receiving the user equipment not reachable indication sent from the first network means.

4. The system according to claim 3, wherein the second network unit, upon receiving the user equipment not reachable indication, is configured to set a flag indicating that the user equipment is not available for user equipment terminated messages.

5. The system according to claim 4, wherein the second network unit is configured to remove the flag when the user equipment performs re-registration towards the second network.

6. The system according to claim 1, wherein the second network unit, upon receiving the user equipment not reachable indication, is configured to terminate the invited session by sending a reject message to a peer entity.

7. The system according to claim 1, wherein the second network unit, upon receiving the user equipment not reachable indication, is configured to terminate all active sessions.

8. The system according to claim 1, wherein the second network unit is configured to initiate the de-registration directly.

9. The system according to claim 1, wherein the first network unit is configured to send the user equipment is not reachable indication to the node in the second network, which initiated said message.

10. The system according to claim 1, wherein the user equipment is not reachable indication is an Internet control message protocol message.

11. The system according to claim 1, wherein the first network is a wireless access network.

12. The system according to claim 1, wherein the second network is an IP multimedia network.

13. The system according to claim 1, wherein the communication channel is a packet data protocol context.

14. A method, comprising:

receiving a message associated with an IP address from at least one second network in a first network unit, the IP address being allocated by the first network to a user equipment based on a communication channel activated by the user equipment in the first network and conveyed to the second network during an application level registration at the second network by the user equipment, wherein the second network provides application services over the first network;

detecting in the first network unit that there is no active communication channel for said IP address;

sending an indication that the user equipment is not reachable through said IP address from the first network unit to the second network;

receiving said indication by a second network unit; and upon receiving the user equipment not reachable indication, initiating a de-registration of the user equipment in the second network, wherein the initiating comprises sending a message with an indication to perform de-registration to a serving network node in the second network, said message being sent to inform at least one other network element that said IP address can no longer be used to reach said user equipment.

15. The method according to claim 14, wherein said message comprises the IP address.

16. The method according to claim 14, further comprising inhibiting, by the second network unit, sending further messages to the unreachable user equipment upon receiving the user equipment not reachable indication sent from the first network unit.

17. The method according to claim 16, upon receiving the user equipment not reachable indication, further comprising setting a flag in the second network, which indicates that the user equipment is not available for user equipment terminated messages.

18. The method according to claim 17, wherein the flag is set in the second network unit.

19. The method according to claim 17, wherein the flag is set in a serving network node.

20. The method according to claim 17, wherein the flag is removed when the user equipment performs re-registration towards the second network.

21. The method according to claim 14, upon receiving the user equipment not reachable indication, comprising terminating the invited session by sending a reject message from the second network unit to a peer entity.

22. The method according to claim 14, upon receiving the user equipment not reachable indication, comprising terminating all active sessions.

23. The method according to claim 14, wherein the de-registration is performed by the second network unit directly.

24. A system, comprising:

at least one first network and at least one second network providing application services over the first network, the first network allocating an IP address to a user equipment based on a communication channel activated by the user equipment in the first network, the IP address being conveyed to the second network during an application level registration at the second network by the user equipment;

a detector configured to detect that the IP address is de-allocated by the first network;

an initiating unit configured to initiate a de-registration of the de-allocated IP address in the second network; and a control entity configured to communicate with a gating network element in the first network and a dedicated call serving network element in the second network, the dedicated call serving network element serving the requested application, wherein the gating network element detects a communication channel deactivation, and informs the control entity thereof, and wherein the control entity detects that the deactivated communication channel represents a signaling packet data protocol context and initiates the de-registration in the dedicated call serving network element by sending a message, said message being sent to inform at least one other network element that said IP address can no longer be used to reach said user equipment.

25. The system according to claim 24, wherein the gating network element supplies an indication of the signaling packet data protocol context to the control entity.

26. The system according to claim 24, wherein the control entity detects that the deactivated communication channel represents a signaling packet data protocol context by checking request state information in the control entity.

27. The system according to claim 24, wherein the gating network element is informed by a serving network element in the first network about a communication channel deactivation and forwards this information to the control entity.

28. The system according to claim 24, wherein a network element in the first network detects the de-allocation of the IP address and informs a server about the de-allocation, and the server initiates de-registration in call serving network elements in the second network, to which said IP-address is associated with.

29. The system according to claim 28, wherein the server is a home subscriber server.

30. The system according to claim 28, wherein the network element in the first network informs a database about the de-allocation, a home database informs a mobility serving entity about the de-allocation, and the mobility serving entity initiates the de-registration in a dedicated call serving network element in the second network, the dedicated call serving network element serving the requested application.

31. The system according to claim 28, wherein the network element in the first network detects a detach of the user equipment causing the de-allocation for all IP addresses of the user equipment and informs the server about the de-allocation, and the server initiates the de-registration in all call serving network elements of the user equipment.

32. The system according to claim 28, wherein a gating network element in the first network stores addresses of call serving network elements proposed to the user equipment against the allocated IP address and a user identification, the gating network element allocating the IP address and being involved in a discovery procedure of one of the call serving network elements in the second network, the call serving network elements being able to serve the requested application, and, when the gating network element detects the de-allocation of the IP address, it initiates de-registration in all stored call serving network elements associated with the IP addresses in the second network.

33. The system according to claim 28, wherein the user equipment informs a gating network element in the first network whenever it registers with a call serving network element in the second network, the gating network element allocating the IP address and being involved in the discovery procedure of the call serving network element in the second network, the call serving network elements being able to serve the requested application, wherein the gating network element stores addresses of the registered call serving network elements against the allocated IP addresses and a user identification, and, when the gating network element detects the de-allocation of the IP addresses, it initiates the de-registration in all stored call serving network nodes associated with the IP addresses.

34. The system according to claim 28, wherein a de-allocation of the IP address caused by a communication channel deactivation is detected by a gating network element in the first network, and the server is informed by the gating network element about the de-allocation.

35. The system according to claim 28, wherein a de-allocation of the IP address caused by a detach of the user equipment is detected by a serving network element in the first network, and a home server is informed by the serving network element about the de-allocation.

36. The system according to claim 28, wherein the server is informed by the user equipment about all the call serving network elements the user equipment is registered with.

37. The system according to claim 24, wherein the IP address is de-registered in the second network by deleting a record in a home server in the first network by a call serving network element in the second network.

38. The system according to claim 24, wherein an IP address is allocated for each communication channel request performed by the user equipment.

39. The system according to claim 24, wherein the initiation of the de-registration comprises the supply of a de-register message.

40. The system according to claim 24, wherein the first network is a wireless access network.

41. The system according to claim 24, wherein the second network is an IP multimedia network.

42. The system according to claim 24, wherein the communication channel is a packet data protocol context.

43. An apparatus, comprising:
a receiver configured to receive information from a gating network element in a first network about a communication channel deactivation, wherein the apparatus communicates with a dedicated call serving network element in a second network which provides application services over the first network, the first network allocates an IP address to a user equipment based on a communication channel activated by the user equipment in the first network, the IP address being conveyed to the second network during an application level registration at the second network by the user equipment, and the dedicated call serving network element serves a requested application; and
a detector configured to detect that the deactivated communication channel represents a signaling packet data protocol context and initiates the de-registration in the dedicated call serving network element by sending a message to inform at least one other network element that said IP address can no longer be used to reach said user equipment.

44. A method, comprising:
detecting that an IP address allocated to a user equipment is de-allocated by at least one first network, wherein the first network communicates with at least one second network that provides application services over the first network, and the first network allocates the IP address to the user equipment based on a communication channel activated by the user equipment in the first network, the IP address being conveyed to the second network during an application level registration at the second network by the user equipment;
initiating a de-registration of the de-allocated IP address in the second network;
providing a control entity being arranged to communicate with a gating network element in the first network and a dedicated call serving network element in the second network; and
detecting at the dedicated call serving network element serving the requested application a communication channel deactivation by the gating network element and informing the control entity thereof,
wherein when it is detected by the control entity that the deactivated communication channel represents a signaling packet data protocol context, the de-registration in the dedicated call serving network element is initiated, and wherein the de-registration is initiated by sending a message to inform at least one other network element that said IP address can no longer be used to reach said user equipment.

45. The method according to claim 44, wherein an indication of the signaling packet data protocol context is supplied to the control entity by the gating network element.

46. The method according to claim 44, wherein it is detected by the control entity that the deactivated communication channel represents the signaling packet data protocol context by checking request state information in the control entity.

47. The method according to claim 44, wherein the gating network element is informed by a serving network element in the first network about the communication channel deactivation and this information is forwarded to the control entity.

48. The method according to claim 44, wherein the de-allocation of the IP address is detected by a network element in the first network and a server is informed about the de-allocation, and de-registration is initiated in call serving network elements in the second network, to which said JP-address is associated with.

49. The method according to claim 48, wherein the server is a home subscriber server.

50. The method according to claim 48, wherein a database is informed by the network element in the first network about the dc-allocation, a mobility serving entity is informed by a home database about the de-allocation, and the de-registration is initiated by the mobility serving entity in a dedicated call serving network element in the second network, the dedicated call serving network element serving the requested application.

51. The method according to claim 48, wherein a detach of the user equipment causing the de-allocation for all IP addresses of the user equipment is detected by the network element in the first network and the server is informed about the de-allocation by the network element, and de-registration in all call serving network elements of the user equipment is initiated by the server.

52. The method according to claim 48, wherein addresses of call serving network elements proposed to the user equipment against the allocated IP address and a user identification are stored in a gating network element in the first network, the gating network element allocating the IP address and being involved in the discovery procedure of a call serving network element in the second network, the call serving network elements being able to serve the requested application, and, when the gating network element detects the dc-allocation of the IP address, de-registration in all stored call serving network elements associated with the IP addresses in the second network is initiated by the gating network element.

53. The method according to claim 48, wherein a gating network element in the first network is informed by the user equipment whenever it registers with one of the call serving network elements in the second network, the gating network element allocating the IP address and being involved in the discovery procedure of said one of the call serving network elements in the second network, the call serving network elements being able to serve the requested application, wherein the gating network element stores addresses of the registered call serving network elements against the allocated IP addresses and a user identification, and, when the gating network element detects the de-allocation of the IP addresses, it initiates the de-registration in all stored call serving network nodes associated with the IP addresses.

54. The method according to claim 48, wherein a de-allocation of the IP address caused by a communication channel deactivation is detected by a gating network element in the first network, and the server is informed by the gating network element about the de-allocation.

55. The method according to claim 48, wherein a de-allocation of the IP address caused by a detach of the user equipment is detected by a serving network element in the first network, and the home server is informed by the serving network element about the de-allocation.

56. The method according to claim 48, wherein the server is informed by the user equipment about all call serving network elements the user equipment is registered with.

57. The method according to claim 44, wherein the IP address is de-registered in the second network by deleting a record in a home server in the first network by a call serving network element in the second network.

58. The method according to claim 44, wherein an IP address is allocated for each communication channel request performed by the user equipment.

59. The method according to claim 44, wherein the initiation of the de-registration comprises the supply of a de-register message.

60. The method according to claim 44, wherein the first network is a wireless access network.

61. The method according to claim 44, wherein the second network is an IP multimedia network.

62. The method according to claim 44, wherein the communication channel is a packet data protocol context.

63. A system, comprising:
   at least one first network and at least one second network providing application services over the first network, the first network allocating an IP address to a user equipment based on a communication channel activated by the user equipment in the first network, the IP address being conveyed to the second network during an application level registration at the second network by the user equipment;
   first network means for receiving a message associated with said IP address from the second network, for detecting that there is no active communication channel for said IP address, and for sending an indication that the user equipment is not reachable through said IP address to the second network; and
   second network means for receiving said indication,
   wherein the second network means, upon receiving the user equipment not reachable indication, initiates a de-registration of the user equipment in the second network, and
   wherein the second network means, for initiating the de-registration, sends a message with an indication to perform de-registration to a serving network node in the second network, said message being sent to inform at least one other network element that said IP address can no longer be used to reach said user equipment.

64. A system, comprising:
   at least one first network and at least one second network providing application services over the first network, the first network allocating an IP address to a user equipment based on a communication channel activated by the user equipment in the first network, the IP address being conveyed to the second network during an application level registration at the second network by the user equipment;
   detecting means for detecting that the IP address is de-allocated by the first network;
   initiating means for initiating a de-registration of the de-allocated IP address in the second network; and control entity means for communicating with a gating network element in the first network and a dedicated call serving network element in the second network, the dedicated call serving network element serving the requested application, wherein the gating network element detects a communication channel deactivation, and informs the control entity means thereof, and wherein the control entity means detects that the deactivated communication channel represents a signaling packet data protocol context and initiates the de-registration in the dedicated call serving network element by sending a message to inform at least one other network element that said IP address can no longer be used to reach said user equipment.

65. An apparatus, comprising:

receiving means for receiving information from a gating network element in a first network about a communication channel deactivation, wherein the apparatus communicates with a dedicated call serving network element in a second network which provides application services over the first network, the first network allocates an IP address to a user equipment based on a communication channel activated by the user equipment in the first network, the IP address being conveyed to the second network during an application level registration at the second network by the user equipment, and the dedicated call serving network element serves a requested application; and detecting means for detecting that the deactivated communication channel represents a signaling packet data protocol context and initiates the de-registration in the dedicated call serving network element by sending a message to inform at least one other network element that said IP address can no longer be used to reach said user equipment.

66. An apparatus, comprising:

a receiver configured to receive a message associated with an IP address from a second network which uses the IP address and provides application services over the first network, the IP address being allocated by a first network to a user equipment based on a communication channel activated by the user equipment in the first network, the IP address being conveyed to the second network during an application level registration at the second network by the user equipment, a detector configured to detect that there is no active communication channel for said IP address, and a transmitter configured to send an indication that the user equipment is not reachable through said IP address to the second network said indication comprising a message that informs at least one other network element that said IP address can no longer be used to reach said user equipment.

67. An apparatus, comprising:

a transmitter configured to send a message associated with an IP address from a second network, which uses the IP address and provides application services over a first network, to the first network, the IP address being allocated by the first network to a user equipment based on a communication channel activated by the user equipment in the first network, the IP address being conveyed to the second network during an application level registration at the second network by the user equipment, a receiver configured to receive an indication that the user equipment to which the IP address is allocated is not reachable through said IP address, and an initiating unit configured to, upon receiving the user equipment not reachable indication, initiate a de-registration of the user equipment in the second network, wherein, for initiating the de-registration, the initiating unit is configured to send a message with an indication to perform de-registration to a serving network node in the second network by sending a message to inform at least one other network element that said IP address can no longer be used to reach said user equipment.

* * * * *